US012698651B2

(12) United States Patent
Inan et al.

(10) Patent No.: US 12,698,651 B2
(45) Date of Patent: Aug. 4, 2026

(54) LOCK STRIKER FOR A MOTOR VEHICLE DOOR LOCK

(71) Applicant: Kiekert Aktiengesellschaft, Heiligenhaus (DE)

(72) Inventors: Ömer Inan, Dorsten (DE); Peter Szegeny, Engelskirchen (DE); Holger Schiffer, Meerbusch (DE); Michael Scholz, Essen (DE); Andreas Schmitz, Velbert (DE); Thorsten Bendel, Oberhausen (DE); Michael Herrmann, Neukirchen-Vluyn (DE)

(73) Assignee: Kiekert Aktiengesellschaft, Heiligenhaus (DE)

( * ) Notice: Subject to any disclaimer, the term of this patent is extended or adjusted under 35 U.S.C. 154(b) by 0 days.

(21) Appl. No.: 18/881,922

(22) PCT Filed: Jun. 5, 2023

(86) PCT No.: PCT/DE2023/100426
§ 371 (c)(1),
(2) Date: Jan. 7, 2025

(87) PCT Pub. No.: WO2024/012621
PCT Pub. Date: Jan. 18, 2024

(65) Prior Publication Data

US 2026/0002387 A1 Jan. 1, 2026

(30) Foreign Application Priority Data

Jul. 11, 2022 (DE) ..................... 10 2022 117 246.5

(51) Int. Cl.
*E05B 77/04* (2014.01)
*E05B 85/04* (2014.01)

(52) U.S. Cl.
CPC ............ *E05B 77/04* (2013.01); *E05B 85/045* (2013.01)

(58) Field of Classification Search
CPC ........ E05B 77/04; E05B 77/10; E05B 85/045; E05B 85/04; E05B 85/26; E05B 15/02;
(Continued)

(56) References Cited

U.S. PATENT DOCUMENTS 2,775,799 A * 1/1957 Friedrich .............. E05B 15/022 292/341.15
3,680,902 A * 8/1972 Slattery ................. E05B 85/045 292/341.14
(Continued)

FOREIGN PATENT DOCUMENTS

CN 101624887 A * 1/2010 ......... E05B 15/0295
DE 102010021677 A1 12/2011
(Continued)

OTHER PUBLICATIONS

International Search Report mailed Aug. 29, 2023, for International Application No. PCT/DE2023/100426.

*Primary Examiner* — Steven A Tullia
(74) *Attorney, Agent, or Firm* — Renner, Otto, Boisselle & Sklar, LLP

(57) ABSTRACT

The invention relates to a lock striker (1, 25) for a motor vehicle door lock, having a lock striker plate (2, 30) and a lock striker bracket (3) which is secured to the lock striker plate. The lock striker bracket (3) is formed with a locking pin (4), a central piece (6), and a connecting region (7, 24), wherein the lock striker bracket (3) is designed in at least two parts, and the central piece (6) and the connecting region (7, 24) are made of a sheet metal strip (5, 23).

14 Claims, 2 Drawing Sheets

(58) Field of Classification Search
CPC .... E05B 15/025; E05B 15/0205; E05B 15/52; E05B 2015/023; E05B 2063/0026; E05B 17/0004; Y10T 292/68; Y10T 292/683; E05C 9/1808
See application file for complete search history.

(56) References Cited

U.S. PATENT DOCUMENTS

| | | | | |
|---|---|---|---|---|
| 4,733,892 | A * | 3/1988 | Kleefeldt | E05B 85/045 292/216 |
| 4,998,759 | A * | 3/1991 | Peterson | E05B 85/045 292/DIG. 53 |
| 5,316,354 | A * | 5/1994 | Arabia, Jr. | E05B 77/40 292/DIG. 41 |
| 5,707,092 | A * | 1/1998 | Van Slembrouck | E05B 85/045 292/341.12 |
| 5,785,365 | A * | 7/1998 | Lorey | E05B 85/045 292/216 |
| 5,927,774 | A * | 7/1999 | Granger | E05B 85/045 292/216 |
| 6,095,576 | A * | 8/2000 | Burton | E05B 85/045 292/340 |
| 6,106,037 | A * | 8/2000 | Burton | E05B 85/045 292/DIG. 53 |
| 6,267,421 | B1 * | 7/2001 | Burton | E05B 77/40 292/DIG. 53 |
| 6,273,480 | B1 * | 8/2001 | Burton | E05B 85/045 292/340 |
| 6,883,842 | B2 * | 4/2005 | Paskonis | E05B 85/045 292/DIG. 64 |
| 7,111,881 | B2 * | 9/2006 | Paskonis | E05B 85/045 292/DIG. 64 |
| 7,140,652 | B2 * | 11/2006 | Johnson | E05B 85/045 292/341.12 |
| 7,703,818 | B2 * | 4/2010 | Fannon | E05B 85/045 292/341.14 |
| 7,744,135 | B2 * | 6/2010 | Wiese | E05B 85/045 292/341.15 |
| 7,828,348 | B2 * | 11/2010 | Bolbocianu | E05B 85/045 29/527.1 |
| 9,205,500 | B2 * | 12/2015 | Haake | E05B 19/00 |
| 11,384,575 | B2 * | 7/2022 | Bellavia | E05B 85/045 |
| 2003/0090114 | A1 * | 5/2003 | Kang | E05B 15/0205 292/341.12 |
| 2007/0241570 | A1 | 10/2007 | Paskonis | |
| 2007/0262595 | A1 * | 11/2007 | Johnson | E05B 85/045 292/340 |
| 2008/0100070 | A1 | 5/2008 | Fannon et al. | |
| 2008/0217930 | A1 * | 9/2008 | Bennett | F16B 37/061 292/253 |

FOREIGN PATENT DOCUMENTS

| | | | | | |
|---|---|---|---|---|---|
| DE | 102013013937 | B3 | | 2/2015 | |
| DE | 102014006857 | A1 | | 11/2015 | |
| DE | 102008024154 | B4 | * | 8/2016 | E05B 85/045 |
| DE | 19645506 | B4 | * | 9/2016 | E05F 5/022 |
| EP | 1582661 | A2 | * | 10/2005 | E05B 85/045 |
| EP | 2031158 | A2 | | 3/2009 | |
| EP | 2128360 | A1 | | 12/2009 | |
| EP | 2270295 | A2 | * | 1/2011 | E05B 85/045 |
| FR | 2701991 | A1 | * | 9/1994 | E05B 85/045 |
| FR | 2772820 | A1 | * | 6/1999 | E05B 85/045 |
| FR | 2803322 | A1 | * | 7/2001 | E05B 85/045 |
| JP | H0568752 | | * | 4/1993 | E05B 15/02 |
| JP | H0586751 | | * | 4/1993 | E05B 15/02 |
| JP | H07229345 | A | * | 8/1995 | E05B 85/045 |
| JP | 2940256 | B2 | * | 8/1999 | E05B 15/02 |
| JP | 3303866 | B2 | * | 7/2002 | E05B 15/02 |
| JP | 2005059753 | A | | 3/2005 | |
| KR | 200144111 | Y1 | * | 6/1999 | E05B 85/04 |
| PT | 2096238 | E | * | 2/2011 | E05B 15/024 |
| WO | WO-9532347 | A1 | * | 11/1995 | E05B 77/38 |
| WO | WO-2013093090 | A1 | * | 6/2013 | E05B 79/08 |
| WO | WO-2017054803 | A1 | * | 4/2017 | E05B 17/10 |

* cited by examiner

LOCK STRIKER FOR A MOTOR VEHICLE DOOR LOCK

This application is a national phase of International Application No. PCT/DE2023/100426 filed Jun. 5, 2023, which claims priority to German Application No. 10 2022 117 246.5 filed Jul. 11, 2022, each of which is hereby incorporated herein by reference in its entirety.

FIELD OF DISCLOSURE

The invention relates to a lock striker for a motor vehicle door lock having a lock striker plate and a lock striker bracket which is secured to the lock striker plate, wherein the lock striker bracket is formed with a locking pin, a central piece and a connecting region.

BACKGROUND OF DISCLOSURE

The lock striker generally interacts with a locking mechanism of an associated motor vehicle door lock. The lock striker and motor vehicle door lock generally define the motor vehicle door locking means. In conjunction with the locking mechanism in the motor vehicle door lock, the lock striker ensures a secure and reliable closure of the associated motor vehicle door. For this purpose, the lock striker is usually connected to a vehicle body, for example a B or C pillar of the associated vehicle body. The vehicle door lock, on the other hand, is located in the vehicle door to be locked. In principle, this can also be reversed.

Due to the primary closing function of the lock striker in conjunction with the locking mechanism in the motor vehicle door lock, i.e., on the one hand, a particularly safety-relevant component which, on the other hand, is exposed to particular loads in particular in the event of an accident. In fact, the protection of vehicle occupants in the event of a side impact depends substantially on how reliably the lock striker and the locking mechanism interacting therewith are capable of absorbing the forces acting thereon. This is because it is primarily important that the vehicle door remains closed so that the safety devices provided in or on the vehicle door, such as brake assist, side airbag, side impact protection, etc., can have the desired effect.

The forces to be absorbed via the interaction between the motor vehicle door lock and the lock striker act directly between the locking mechanism contained in the motor vehicle door lock and the locking pin of the lock striker bracket which engages with the locking mechanism. The locking mechanism is formed by a catch and at least one pawl, wherein a pawl engages in the catch of the lock striker after the catch engages in the closing movement of the door element and prevents the door element from opening. The locking mechanism may have a preliminary latch and a main latch which can be present in the door lock depending on the door element. Depending on the embodiment of the locking mechanism, the particular latch position, i.e., main latch or preliminary latch, can be provided with an opening or closing moment, so that a blocking lever can be used to secure the latch position. In order to be able to absorb the high forces that occur in the event of an accident, the locking mechanism parts are made at least in part from a metal material, mounted in metal shafts and held on a metal lock plate in the vehicle door lock.

In the prior art, various approaches have already been pursued to further develop such lock strikers so that they can absorb far more forces than before in the event of a crash, without tearing off or general mechanical damage occurring or being able to occur. In fact, with regard to the lock striker, material deformations and tears are often observed in practice, in particular at the transition from the lock striker bracket to the lock striker plate.

Various approaches have been developed to increase the forces that can be absorbed by the lock striker. There are various approaches to providing the lock striker or its lock striker bracket with different cross-sectional thicknesses, as described for example in EP 2 031 158 A2, or to specify an elongation of the lock striker by means of an indentation, as disclosed for example in DE 10 2010 021 677 A1. However, this does not adequately reflect the loads that actually occur in practice and the associated deformation behavior of the lock striker in the event of a crash or extreme forces. It has become apparent that the connection between the lock striker bracket and the lock striker plate is particularly important.

DE 10 2014 006 857 A1 discloses a lock striker for a motor vehicle door lock, which lock striker has a lock striker plate and a lock striker bracket attached thereto, wherein the lock striker bracket is designed with a locking pin, a central piece and a connecting pin. To strengthen the connection between the lock striker bracket and the lock striker plate, the publication proposes that the lock striker bracket be positively connected to the lock striker plate via at least one material-thickened region. To ensure a positive connection, the part of the lock striker bracket or the locking pin and/or the connecting pin which protrudes beyond the lock striker plate is compressed. As a result of the compression process, the lock striker plate is also provided with a bulge which ensures that compression caps created on the underside of the lock striker plate as a result of the compression process can abut at a distance from the locking pin on the one hand and the connecting pin on the other hand in relation to the body.

The solutions known from the prior art have generally proven themselves, but have reached their limits with more recent developments in the vehicle industry. The use of batteries in hybrid or electric vehicles increases the loads on the motor vehicle door lock in the event of an accident. The batteries present in the motor vehicle increase the total weight of the vehicle many times over, so that the loads on the locking mechanism and the lock striker in the event of an accident are also increased. Consequently, approaches must be found to increase the strength of the lock striker. This is where the invention comes in.

SUMMARY OF DISCLOSURE

The object of the invention is to provide an improved lock striker for a motor vehicle door lock. In particular, it is an object of the invention to improve the load capacity of the lock striker and to increase the tear resistance of the system consisting of the lock and the lock striker.

According to the invention, the object is achieved by the features of independent claim 1. Advantageous embodiments of the invention are specified in the dependent claims. It should be noted, however, that the embodiments described below are not restrictive; rather, any variation of the features described in the description and the dependent claims is possible.

According to claim 1, the object of the invention is achieved by providing a lock striker for a motor vehicle door lock, having a lock striker plate and a lock striker bracket which is secured to the lock striker plate, wherein the lock striker bracket is formed with a locking pin, a central piece and a connecting region, wherein the lock striker bracket is designed in at least two parts and the central piece and the connecting region are made of a sheet metal strip. The structure of the lock striker according to the invention now makes it possible to reinforce the lock striker individually. The use of a sheet metal strip in particular makes it possible to adjust the required strength or tensile strength of the lock striker. The strength can be adjusted depending on the thickness of the sheet metal strip.

A further possibility for adjusting the tensile strength is that different materials can be used for the sheet metal strip. This makes it possible to customize the lock striker and adapt it to the requirements of the relevant vehicle. In an advantageous manner, the lock striker bracket is structured in two parts and consists of a substantially cylindrical locking pin, which is preferably connected to the sheet metal strip and the lock striker plate by means of a forming process. A preferred forming process here is cold heading or riveting. The combination of the two-part design and the formation of the central piece and the connecting region from a sheet metal strip thus makes it possible to adapt to the increased requirements, especially in the event of an accident, to provide the lock striker with sufficient strength even in extreme situations. In particular, the sheet metal strip can be manufactured in a lightweight design, which again has a positive effect on the overall cost of the lock striker. Sheet metal is also available in different strengths and in a variety of different materials, which in turn has a positive effect on the manufacturing costs of the lock striker.

In the event of an accident in particular, the locking system consisting of the vehicle lock and lock striker is exposed to extreme loads. These loads are simulated during the release of the locking system in tensile tests and tear tests, among other things. This involves loading the lock striker in a tensile test until it breaks in order to determine whether the specifications are met and to identify any weak points. The structure of the lock striker according to the invention now makes it possible to individually adapt the lock striker to the loads.

As already mentioned above, the lock striker according to the invention not only relates to a side door, but can also be used in the region of a hood, tailgate, sliding door, cover, fold-down bench seats, etc. It can be used wherever swivel-mounted or sliding structural parts on the motor vehicle need to be held securely in position.

In principle, the lock striker has a lock striker plate. The lock striker plate is usually screwed to the body or movable component using two screws, allowing the lock striker and vehicle lock to work together. The lock striker plate can also have a folded edge so that any rivet heads provided for the further components of the lock striker can be accommodated in the folded edge, enabling at least part of the lock striker plate to be mounted flat to the body. The folded edge then accommodates the corresponding rivet heads of the further components of the lock striker.

The lock striker has a lock striker bracket consisting of a locking pin, a central piece and a connecting region. These components together form a bracket shape, and therefore these structural parts can also be referred to as lock striker brackets. The arrangement of the locking pin, central piece and connecting region, which can be described as a bracket shape, are designed in two parts according to the invention and are connected by means of forming, in particular cold upsetting. The bracket shape forms an opening through which a locking mechanism of a motor vehicle lock can interact with the lock striker. Here, a locking mechanism arranged in the motor vehicle lock, consisting of a catch and at least one pawl, is moved relative to the lock striker in such a manner that the catch can move around the locking pin, after which a pawl subsequently locks the catch in its engaged position. Depending on the region of application of the motor vehicle lock or lock striker, a pre-locking position and/or a main locking position can be assumed here.

The catch encloses the locking pin in the latching position (s). If an extreme load is applied to the locking system in one of these locking positions, the catch moves over the locking pin until it comes into contact with the central piece of the lock striker. Depending on the force acting on the locking system, the side door, for example, must be able to withstand the tensile forces and prevent the side door from opening. Due to the increased or further increasing demands on the locking system, it is necessary to adapt the lock striker to these increased requirements. Due to the structure of the lock striker according to the invention with a separate locking pin and a central piece formed as a sheet metal strip and the connecting region, individual adaptation to the increased and further increasing loads can be made.

In an advantageous further embodiment of the invention, the sheet metal strip is non-detachably connected to the lock striker plate. If it is technically possible to insert or hook the sheet metal strip into a recess in the lock striker plate, the advantageous further embodiment of the invention claims the possibility of non-detachably connecting the sheet metal strip to the lock striker plate. In this structurally simple design of the lock striker, a simple, cost-effective and advantageous design variant of the invention in terms of production technology can be achieved. The design is cost-effective in that a sheet metal strip can be easily punched out of a sheet, in that the sheets are available in multiple embodiments and different materials, and cost-effective in terms of production, as a sheet metal strip can be easily punched and formed.

It can also be advantageous if the sheet metal strip is connected to the lock striker plate by means of forming, in particular riveting. The forming of the sheet metal strip offers the advantage that the sheet metal strip itself can be connected directly to the lock striker plate, so that further design adjustments to the sheet metal strip can be omitted. This has the advantage that the sheet metal strip can be designed in the simplest possible way, which in turn has a positive effect on the overall manufacturing costs of the lock striker. It is also possible to achieve high stability in the forming region and thus in the connection between the sheet metal strip and the lock striker plate by forming the entire sheet metal strip in the region of the lock striker plate.

A recess can be provided in the lock striker plate into which the sheet metal strip can be inserted and subsequently formed. If the sheet metal strip or an extension of the connecting region is inserted into the lock striker plate, the sheet metal strip can be embodied in a uniform width. A uniform width of the sheet metal strip can be particularly advantageous in the connecting region, as a high level of stability can be introduced into the lock striker bracket here. If a recess corresponding to the sheet metal strip is now formed in the lock striker plate, a high level of stability can again be introduced into the connection between the connecting region and the lock striker plate. The connecting region and the connection of the connecting region in the lock striker plate can thus strengthen the lock striker bracket overall and ensure a high level of operational reliability, i.e., tensile strength, of the lock striker. Due to the uniform width of the connecting region and the extended region of the connecting region inserted into the lock striker plate, a connection between the connecting region and the lock striker plate can be provided without a notch effect within the sheet metal strip.

According to the invention, it is also advantageous that the sheet metal strip has at least one, preferably two extensions, wherein the extensions can be inserted into corresponding recesses of the lock striker plate and can be formed. The sheet metal strip can be adapted in the connection region to the lock striker plate in such a manner that the sheet metal strip is tapered and can be inserted into a corresponding recess in the lock striker plate. This results in a contact region between the sheet metal strip and the lock striker plate, wherein the contact region can form an abutment for forming the extension. Preferably, the at least one extension or taper of the sheet metal strip in the connection region to the lock striker plate is formed symmetrically, i.e., centrally, on the sheet metal strip. However, it is also conceivable, for example, that two extensions are formed on the metal strip, which can be inserted into corresponding recesses in the lock striker plate. Two preferably symmetrical extensions on the sheet metal strip offer the advantage of easy assembly, as the extensions can also be designed as guides or insertion aids. For example, the extensions can have a taper at the ends passing through the recesses, so that the lock striker bracket or the sheet metal strip can be easily mounted during the manufacture of the lock striker. Preferably, two extensions are formed on the metal strip, wherein three or more extensions can of course also be formed depending on the embodiment and the load on the lock striker.

In a further embodiment of the invention, the sheet metal strip, in particular the connecting region, is bent at least in some regions. An individual design of the connecting region, in particular a bend in the sheet metal strip that can be described as a bulge, results in several advantages. On the one hand, the bent, i.e., curved, design of the sheet metal strip increases the engagement region for a catch and, on the other hand, the bent embodiment of the connecting region can provide material for deforming the lock striker under extreme loads. In other words, deformability is made possible without any loss of stability or strength.

Starting from a sheet metal strip that is bent, i.e., angled, in the simplest case, the sheet metal strip curves in one direction away from the locking pin due to the curved shape. This increases the open region between the locking pin and the connecting region, so that safe movement of the catch can be guaranteed even under extreme loads, i.e., in the event of deformation of the lock striker. In addition, sufficient clearance, i.e., room for movement, can be provided for the lock striker plate, wherein the expansion of the lock striker plate can be reduced to a minimum. The curved shape of the sheet metal strip thus offers the possibility of providing sufficient movement space for the lock striker and, on the other hand, of reducing the extension of the lock striker plate in the direction of the extension of the central piece or the lock striker bracket to a minimum.

In a further embodiment of the invention, the sheet metal strip is at least partially conical in the region of the central piece. On the one hand, the sheet metal strip can have a uniform width, but according to the invention it is also conceivable that the sheet metal strip is tapered starting from the connecting region towards the locking pin. A conical, i.e., symmetrical, taper of the central piece has proven to be particularly advantageous. In particular, the tapered central piece can achieve an advantageous force transmission between the locking pin, central piece and connecting region. In addition, the central piece can be designed to be adaptable to the requirements, i.e., the loads, and in particular the extreme loads. However, a substantial advantage here is the force line, which can be utilized in an advantageous way due to the continuous change in width.

The width of the sheet metal strip can still be an advantage. If the sheet metal strip has a width in a connection region with the locking pin that is wider than the width of an inlet region of a catch, an additional supporting effect can be provided by the sheet metal strip. The width of an inlet region of the catch refers to the region of the catch that extends around the locking pin when the catch is in the load position. The inlet region of the catch is usually tapered, wherein the width of the inlet region has a further width than the locking pin. The locking pin has a free space in the inlet region of the catch even when the catch is in the latching position. According to the invention, the sheet metal strip and in particular the central piece in the connection region with the locking pin is now wider than the inlet region or the opening in the catch in the latching position. The central piece thus covers the inlet region and can provide additional support. As described above, in the event of an extreme situation, for example an accident, the catch will move beyond the locking pin in the direction of the central piece. If the catch now rests circumferentially on the central piece and the central piece is larger than the inlet region, there is an overlap between the catch and the central piece or sheet metal strip. The overlapping of the central piece can have a supporting effect on the locking system consisting of the motor vehicle lock and lock striker.

If the lock striker plate has a depression, wherein the deformations of the locking pin and the sheet metal strip can be accommodated in the depression, this results in a further embodiment variant of the invention. By forming a depression in the lock striker plate, wherein the depression accommodates the rivet heads of the locking pin and the connecting region, a flat contact surface can be provided for the lock striker plate. As a result, the depression corresponds in its extent at least to the height of the cold-formed regions of the locking pin and the connecting region. This means that the cold-formed regions of the lock striker bracket can also form a contact surface for the lock striker on, for example, a B-pillar of a motor vehicle. This ensures that the lock striker is securely attached to the body. In addition, the depression can serve as an assembly aid, for example, if an elevation is provided on the body, so that the depression can serve as a positioning aid during assembly.

The structure of the lock striker according to the invention now makes it possible to adapt the lock striker to the requirements of the motor vehicle by the simplest design means and in a cost-effective manner. In particular, the use of sheet metal strips offers a cost-effective way of meeting the increased requirements of the automotive industry. High strength can be specifically combined with ease of manufacture of the lock striker through a targeted selection of materials and utilized in an advantageous manner.

BRIEF DESCRIPTION OF DRAWINGS

In the following, the invention is explained in more detail with reference to the appended drawings using an embodiment. However, the principle applies that the exemplary embodiment does not limit the invention, but is merely an advantageous embodiment of the invention. The features depicted can be implemented individually or in combination with further features of the description as well as what is claimed-individually or in combination.

In the figures.

DETAILED DESCRIPTION

Figure 1:
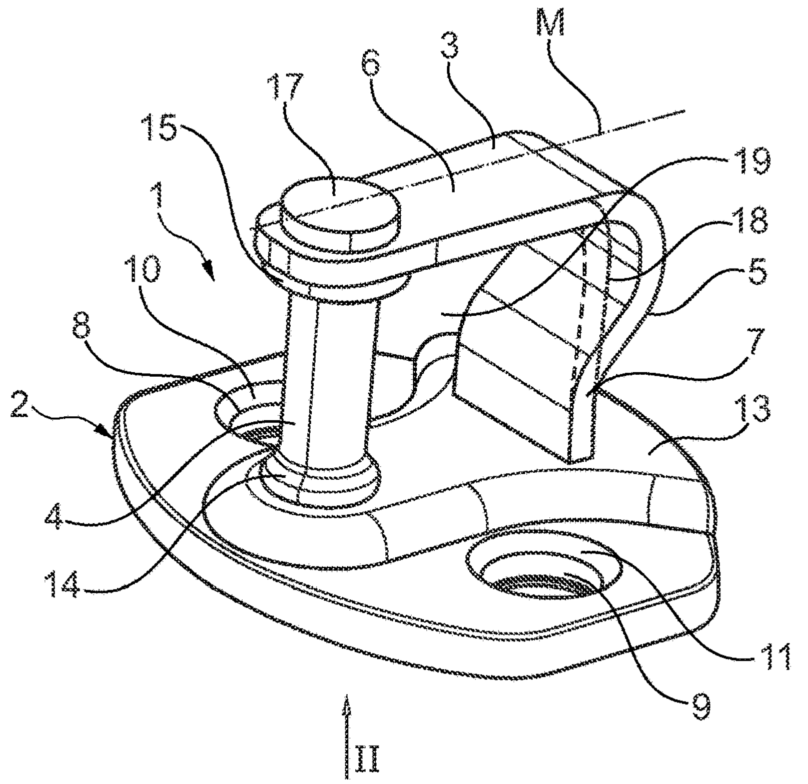
FIG. 1 is a three-dimensional view of a lock striker designed according to the invention.

FIG. 1 is a three-dimensional view of a lock striker 1 designed according to the invention. The lock striker 1 has a lock striker plate 2 and a lock striker bracket 3. The lock striker bracket 3 is structured in two parts and consists of a locking pin 4 and a metal strip 5. The sheet metal strip 5, in turn, is formed from a central piece 6 and a connecting region 7.

The lock striker plate 2 has openings 8, 9, preferably the openings 8, 9 are formed as bores in the lock striker plate. Of course, the openings 8, 9 can also be formed as punched openings or punched apertures 8, 9 with milled or drilled phases 10, 11. In addition, the lock striker plate 2 has a depression 12 which can be molded into the lock striker plate 2, for example by deep drawing. The locking pin 4 and the connecting region 7 are formed in the raised region or elevation 13. For this purpose, the raised region 13 may have recesses and/or bores into which the locking pin 4 and the connecting region 7 are inserted.

The locking pin 4 is substantially cylindrical in structure, but has a material accumulation or a thickening 14, 15 at the respective axial ends. The thickenings 14, 15 serve as contact regions, each of which bears against the lock striker plate 2 and the central piece 6, so that a contact or an abutment is available for cold forming the axial ends 16, 17 of the locking pin 4.

The sheet metal strip 5 is formed from the central piece arranged parallel to the lock striker plate 2 or the raised section 13 and the connecting region 7 arranged only partially parallel to the locking pin 4. The lock striker 1 is structured symmetrically overall, which is illustrated by the dotted central line M. Starting from the locking pin 4, the sheet metal strip 5 or the central piece 6 widens towards a width B, wherein the width B is the width B of the connecting region 7. In other words, the central piece 6 tapers from the connecting region 7 towards the locking pin 4. However, the central piece 6 has a greater width in the connection region with the locking pin 4 than the material accumulation 15. As a result, the central piece 6 is able to extend over an inlet region of a catch and form an additional support surface.

The connecting region 7 extends from the lock striker plate 2 to the parallel region of the central piece 6. In this embodiment, the connecting region 7 is curved so that the sheet metal strip can also be considered an S-shape. Of course, the connecting region 7 can also be straight, as indicated by the dashed line 18. In an advantageous manner, however, the connecting region 7 is embodied in a curved shape, resulting in an enlarged engagement opening 19 for a catch. The structure of the sheet metal strip 5 according to the invention makes it possible to customize the strength of the lock striker 1, in particular by selecting the material, the thickness of the sheet metal strip and/or the material thickness of the sheet metal strip 5.

Figure 2:
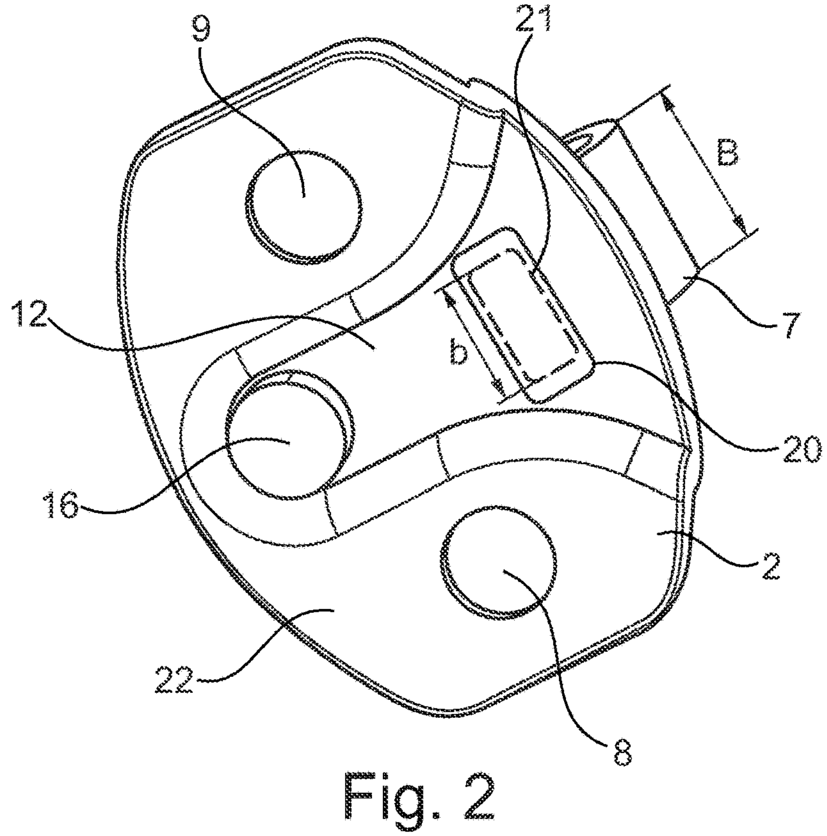
FIG. 2 is a view of the lock striker shown in FIG. 1 as seen from arrow II.

FIG. 2 is a view of the lock striker 1 as shown in FIG. 1 from the perspective of arrow II. The depression 12 in the lock striker plate 2, the openings 8, 9, the cold-formed end 16 and the connecting region 7 can be seen. In this exemplary embodiment, the connecting region 7 has a rectangular extension 20, which is guided through a merely indicated recess 21 and is non-detachably connected to the lock striker plate 2 by means of cold forming. Cold forming is also commonly referred to as riveting. The extension 20 can correspond to the width B of the connecting region 7 or, as shown, have a width b. Due to the difference in width between the connecting region 7 and the extension 20, the connecting region 7 also provides a contact region on the lock striker plate 2, which in turn has a positive effect on cold forming in the region of the depression 12. The depression 12 offers the advantage that the cold-formed regions 16, 20 can be accommodated in the depression 12, resulting in a flat contact surface 22 of the lock striker 1 or the lock striker plate 2.

Figure 3:
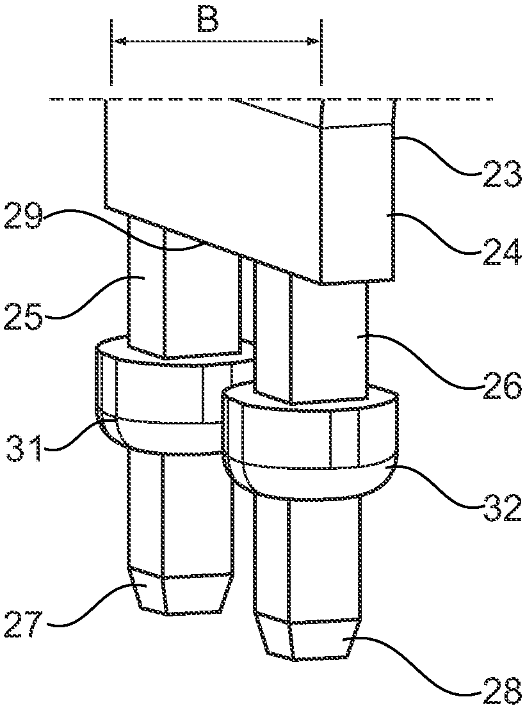
FIG. 3 is an alternative embodiment of a connecting region of the connecting region with the lock plate.

FIG. 3 is an alternative embodiment of a sheet metal strip 23 and, in particular, an alternative embodiment of the connecting region 24 of a lock striker 25. Identical components are provided with the same reference signs. In particular, an identical locking pin 4 can be used. In this embodiment, the sheet metal strip 23 or the connecting region 24 has two extensions 25, 26. The extensions 25, 26 are each shown in their original form and in the cold-formed or riveted form in FIG. 3. In the initial form of the extensions 25, 26, the extensions 25, 26 have chamfers 27, 28, so that assembly aids are available. The extensions 25, 26 extend only partially across the width B of the connecting region 27, so that a contact region 29 is available for cold forming. The contact region 29 lies against the lock striker plate 30 after the connecting region 24 has been inserted. The contact region 29 thus provides an abutment for cold forming the extensions 25, 26. The cold-formed regions or rivets or rivet heads 31, 32 can also be seen in FIG. 3.

Figure 4:
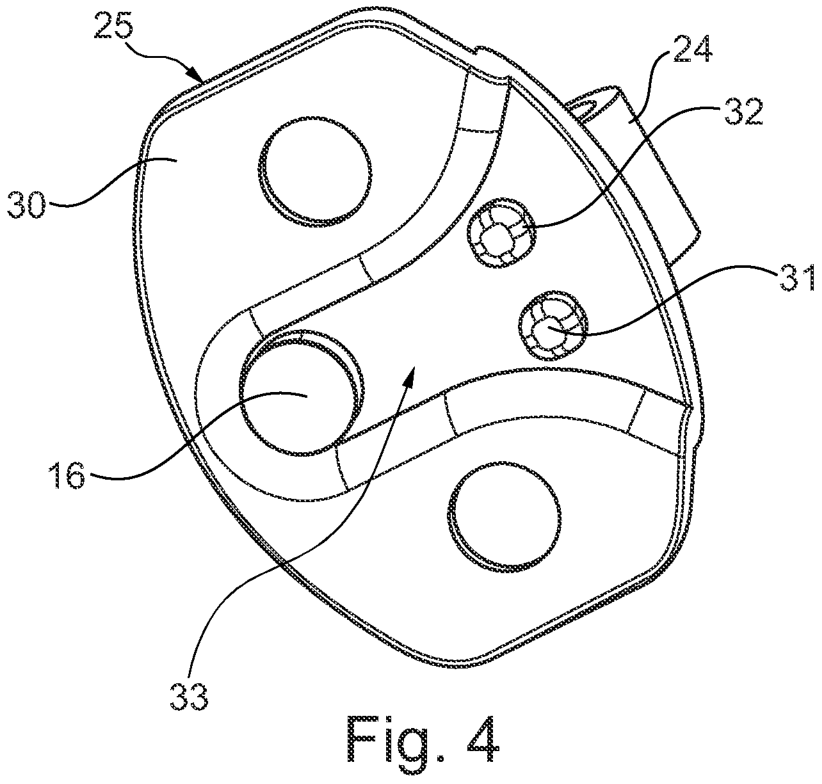
FIG. 4 is a view of the lock striker plate when extensions are used at the connecting region as shown in FIG. 3.

FIG. 4 is a view of the lock striker 25 from an underside of the lock striker plate 30. The rivet heads 31, 32 are clearly visible in the depression 33. The structure according to the invention also allows individual adaptation to the production or assembly process, namely in that the extensions 20, 25, 26 can be adapted to the respective requirements in the motor vehicle. Overall, this results in a customizable lock striker 1, 25 that can also meet the increased requirements for the strength of the lock striker 1, 25.

LIST OF REFERENCE SIGNS

1, 25 lock striker
2, 30 lock striker plate
3 lock striker bracket
4 locking pin
5, 23 sheet metal strip
6 central piece
7, 24 connecting region
8, 9 openings
10, 11, 27, 28 chamfers
12, 33 depression
13 elevation
14, 15 thickening
16, 17 axial ends
18 dashed line
19 engagement opening
20, 25, 26 extension
21 recess
22 flat contact surface
29 contact region
31, 32 rivet heads C central line
B, b width

The invention claimed is:

1. A lock striker for a motor vehicle door lock comprising:

a lock striker plate and a lock striker bracket, wherein the lock striker bracket is secured to the lock striker plate, wherein the lock striker bracket comprises a locking pin, a central piece and a connecting region, wherein the lock striker bracket is designed in at least two parts, wherein the central piece and the connecting region are made of a sheet metal strip, wherein the lock striker plate includes at least one recess, wherein the sheet metal strip includes at least one extension, wherein a respective one of the least one extension is inserted into the recess of the lock striker plate, and wherein a width of the at least one extension is smaller than a width of the connecting region.

2. The lock striker according to claim 1, wherein the sheet metal strip is non-detachably connected to the lock striker plate.

3. The lock striker according to claim 1, wherein the sheet metal strip is connected to the lock striker plate by riveting.

4. The lock striker according to claim 1, wherein the at least one extension is designed with insertion aids.

5. The lock striker according to claim 4, wherein the insertion aids are chamfers.

6. The lock striker according to claim 1, wherein the sheet metal strip in the connecting region is bent at least in some regions.

7. The lock striker according to claim 1, wherein the sheet metal strip is at least partially conical in the region of the central piece.

8. The lock striker according to claim 1, wherein the lock striker plate has a depression, wherein a deformation of the locking pin and the sheet metal strip is accommodated in the depression.

9. The lock striker according to claim 1, further comprising a contact region between the sheet metal strip and the lock striker plate, wherein the contact region forms an abutment for forming the at least one extension.

10. The lock striker according to claim 1, wherein the locking pin of the lock striker bracket is cylindrical.

11. The lock striker according to claim 1, wherein the lock striker plate has two recesses and the sheet metal strip has two extensions that are inserted into corresponding recesses of the lock striker plate.

12. The lock striker according to claim 1, wherein the lock striker plate has an elevated region from which the locking pin and connecting region extend.

13. The lock striker according to claim 1, wherein the locking pin includes material thickenings that serve as contact regions wherein the locking pin bears against the lock striker plate and the central piece.

14. The lock striker according to claim 1, wherein the locking pin and the sheet metal component are separate, wherein the locking pin includes a material thickening that serves as a contact region for cold forming an axial end of the locking pin for attaching the sheet metal component to the axial end of the locking pin.

* * * * *